(12) United States Patent
Prakash et al.

(10) Patent No.: US 9,577,412 B2
(45) Date of Patent: Feb. 21, 2017

(54) SWITCHGEAR HOUSING INCLUDING A FLOATING EXHAUST FLAP ASSEMBLY

(71) Applicant: General Electric Company, Schenectady, NY (US)

(72) Inventors: Ravi Prakash, Andhra Pradesh (IN); Chandrakanth Gopularam, Andhra Pradesh (IN); Debabrata Mukherjee, Andhra Pradesh (IN); Amit Narang, Andhra Pradesh (IN); Prashant Sudhakar Zende, Andhra Pradesh (IN)

(73) Assignee: General Electric Company, Schenectady, NY (US)

( * ) Notice: Subject to any disclaimer, the term of this patent is extended or adjusted under 35 U.S.C. 154(b) by 158 days.

(21) Appl. No.: 14/313,430

(22) Filed: Jun. 24, 2014

(65) Prior Publication Data

US 2015/0372463 A1 Dec. 24, 2015

(51) Int. Cl.
*H02B 13/025* (2006.01)
*H02B 1/56* (2006.01)

(52) U.S. Cl.
CPC ............ *H02B 13/025* (2013.01); *H02B 1/565* (2013.01)

(58) Field of Classification Search
CPC .............................. H02B 1/565; H02B 13/025
USPC .......................... 361/605, 608, 611, 614, 621
See application file for complete search history.

(56) References Cited

U.S. PATENT DOCUMENTS

| | | | |
|---|---|---|---|
| 4,464,703 A | 8/1984 | Davies et al. | |
| 5,574,624 A | 11/1996 | Rennie et al. | |
| 5,689,097 A | 11/1997 | Aufermann et al. | |
| 5,710,402 A * | 1/1998 | Karnbach | H02B 13/025 218/157 |
| 5,803,803 A | 9/1998 | O'Dell et al. | |
| 5,878,905 A * | 3/1999 | Gronbach | H02B 13/025 174/17 VA |
| 5,892,195 A | 4/1999 | Aufermann et al. | |
| 6,417,443 B1 * | 7/2002 | Smith | H02B 1/565 174/17 VA |
| 6,512,669 B1 * | 1/2003 | Goodwin | H02B 13/025 200/50.12 |

(Continued)

FOREIGN PATENT DOCUMENTS

| | | |
|---|---|---|
| CN | 203056375 U | 7/2013 |
| WO | 2009135841 A2 | 11/2009 |

*Primary Examiner* — Anthony Haughton
(74) *Attorney, Agent, or Firm* — GE Global Patent Operation; Stephen G. Midgley

(57) ABSTRACT

A switchgear housing assembly includes a first switchgear housing including a cable compartment portion and a circuit breaker portion, a busbar portion, and a second switchgear housing a cable compartment section, a busbar section, and a circuit breaker section. An exhaust duct is arranged between the first and second switchgear housings. The exhaust duct is selectively fluidically exposed to at least one of the cable compartment portion, cable compartment section, the circuit breaker portion, and the circuit breaker section. A floating flap assembly is operatively associated with at least one of the first and second switchgear housings. The floating flap assembly includes a floating flap member. The floating flap member is selectively slideable between a closed position and an open position in response to a pressure rise in one of the cable compartment portion, cable compartment section, circuit breaker portion, and circuit breaker section.

20 Claims, 4 Drawing Sheets

(56) References Cited

U.S. PATENT DOCUMENTS

| | | | |
|---|---|---|---|
| 7,095,606 B2 | 8/2006 | Mahn et al. | |
| 7,518,851 B2 * | 4/2009 | Tsuchiya | H02B 11/02 174/72 B |
| 7,952,857 B1 | 5/2011 | Motley et al. | |
| 8,598,484 B2 | 12/2013 | Engel et al. | |
| 8,791,361 B2 * | 7/2014 | Gingrich | H02B 1/565 174/17 VA |
| 8,842,421 B2 * | 9/2014 | Gingrich | H01H 33/53 174/17 VA |
| 2010/0258532 A1 * | 10/2010 | Miller | H02B 13/025 218/157 |
| 2014/0110232 A1 * | 4/2014 | Gingrich | H01H 33/53 200/306 |

* cited by examiner

SWITCHGEAR HOUSING INCLUDING A FLOATING EXHAUST FLAP ASSEMBLY

BACKGROUND OF THE INVENTION

The subject matter disclosed herein relates to the art of electrical enclosures and, more particularly, to a switchgear housing including a floating exhaust flap assembly.

In general, a switchgear serves as an interface between an electrical supply and an electrical load. The switchgear includes a line or busbar portion and a load or circuit breaker portion. The busbar portion includes one or more busbars that are connected to the electrical supply. The circuit breaker portion includes one or more circuit breakers that are electrically connected to the one or more busbars and an electrical load. The circuit breaker is configured to interrupt a flow of current from the one or more busbars to the electrical load in the event of an over-current condition, short circuit condition and/or an over/under voltage condition. The interruption of electrical current provides protection for conductors electrically connecting the circuit breaker and the electrical load.

BRIEF DESCRIPTION OF THE INVENTION

According to an exemplary embodiment, a switchgear housing assembly includes a first switchgear housing including a top wall, a bottom wall, a rear wall and first and second side walls extending between the top wall and bottom wall defining an interior portion including a cable compartment portion, bus bar portion and at least one circuit breaker portion, and a second switchgear housing including a top wall, a bottom wall, a rear wall and first and second side walls extending between the top wall and the bottom wall defining an interior portion including a cable compartment section, busbar section and at least one circuit breaker section. An exhaust duct is arranged between the first and second switchgear housings. The exhaust duct is selectively fluidically exposed to at least one of the cable compartment portion, cable compartment section, the at least one circuit breaker portion and the at least one circuit breaker section. A floating flap assembly is operatively associated with at least one of the first and second switchgear housings. The floating flap assembly includes a floating flap member. The floating flap member is selectively slideable between a closed position and an open position in response to a pressure rise in one of the cable compartment portion, cable compartment section, at least one circuit breaker portion and at least one circuit breaker section.

According to another aspect of an exemplary embodiment, a switchgear housing assembly includes a first switchgear housing including a top wall, a bottom wall, a rear wall and first and second side walls extending between the top wall and bottom wall defining an interior portion including a cable compartment portion and at least one circuit breaker portion, a second switchgear housing including a top wall, a bottom wall, a rear wall and first and second side walls extending between the top wall and the bottom wall defining an interior portion including a cable compartment section and at least one circuit breaker section, and an exhaust duct arranged between the first and second switchgear housings. The exhaust duct is selectively fluidically exposed to at least one of the cable compartment portion, cable compartment section, at least one circuit breaker portion and at least one circuit breaker section.

According to yet another aspect of an exemplary embodiment, a switchgear housing assembly includes a switchgear housing having a top wall, a bottom wall, a rear wall and first and second side walls extending between the top wall and bottom wall defining an interior portion including a cable compartment portion and at least one circuit breaker portion. A floating exhaust flap assembly is operatively associated with the switchgear housing. The floating exhaust flap assembly includes a floating flap member. The floating flap member is selectively slideable between a closed position and an open position in response to a pressure rise in one of the cable compartment portion, and at least one circuit breaker portion.

These and other advantages and features will become more apparent from the following description taken in conjunction with the drawings.

BRIEF DESCRIPTION OF DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
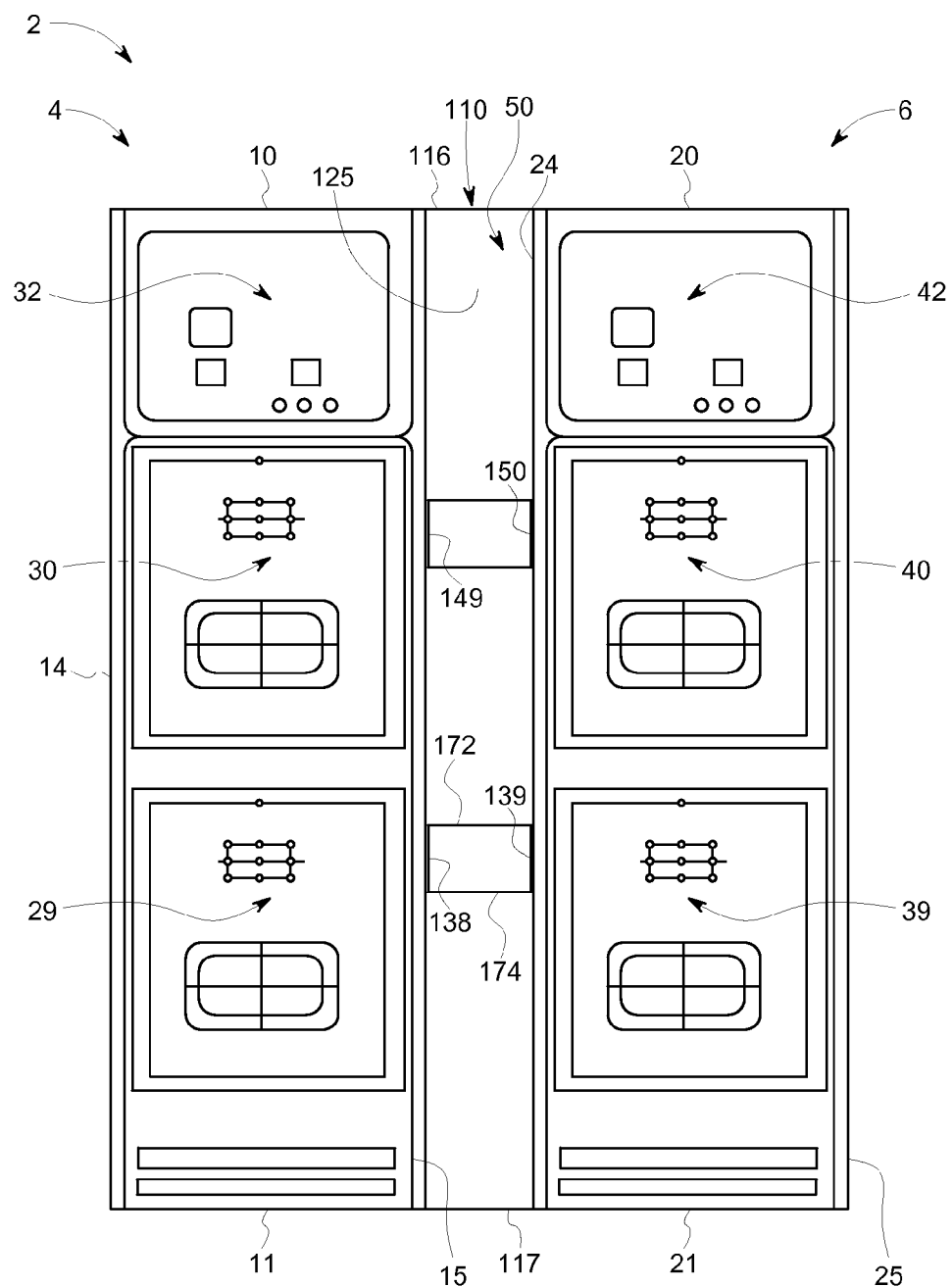
FIG. 1 is an elevational view of a switchgear housing assembly, in accordance with an exemplary embodiment.
Figure 2:
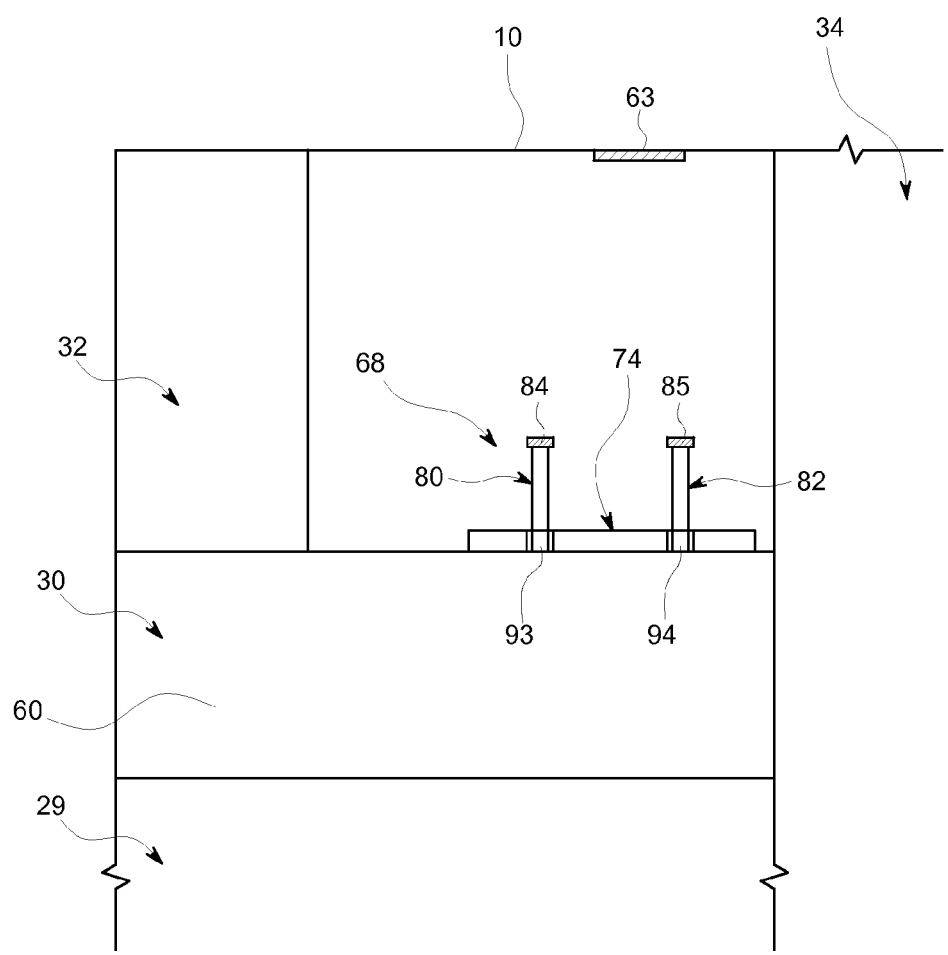
FIG. 2 is a partial cross-sectional side view of a floating exhaust flap assembly, in accordance with an aspect of an exemplary embodiment.
Figure 3:
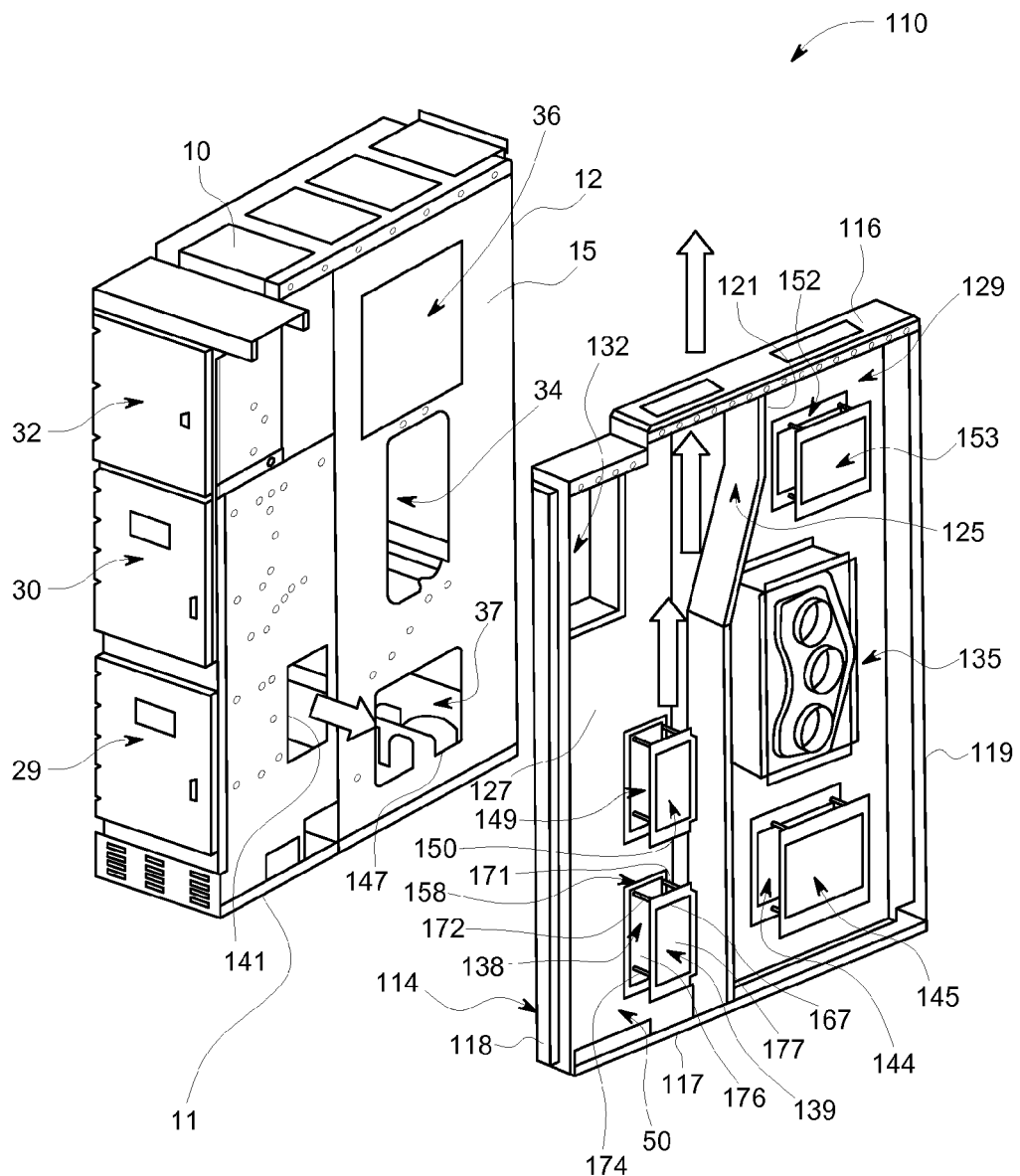
FIG. 3 is a partial, exploded view of the switchgear housing assembly of FIG. 1 illustrating a floating exhaust flap assembly, in accordance with another aspect of an exemplary embodiment.

A switchgear housing assembly, in accordance with an exemplary embodiment, is indicated generally at 2, in FIGS. 1-3. Switchgear housing assembly 2 includes a first switchgear housing 4 mechanically linked to a second switchgear housing 6, as will be detailed more fully below. First switchgear housing 4 includes a top wall 10, a bottom wall 11, a rear wall 12, a first side wall 14 and a second, opposing side wall 15. Similarly, second switchgear housing 6 includes a top wall 20, a bottom wall 21, a rear wall (not shown), a first side wall 24 and a second, opposing side wall 25.

First switchgear housing 4 includes a first circuit breaker portion 29 and a second circuit breaker portion 30. A monitoring or low voltage (LV) section 32 is arranged above second circuit breaker portion 30. LV section 32 may include one or more gauges (not separately labeled) that provide operational details of first and/or second circuit breaker portions 29 and 30. LV section 32 may also include cables that provide an electrical connection to a remote monitoring site. First switchgear housing 4 also includes a busbar portion 34 that accommodates busbars (not shown) that provide electrical power to circuit breakers (also not shown) mounted in first and second circuit breaker portions 29 and 30, an upper cable compartment portion 36 and a lower cable compartment portion 37. Of course the terms "upper"

and "lower" are being used to describe the exemplary embodiment illustrated in FIG. 2 and should not be considered as being limiting.

Similarly, second switchgear housing 6 includes a first circuit breaker portion 39 and a second circuit breaker portion 40. A monitoring or LV section 42 is arranged above second circuit breaker portion 40. LV section 42 may include one or more gauges (not separately labeled) that provide operational details of first and/or second circuit breaker portions 39 and 40. LV section 42 may also include cables that provide an electrical connection to a remote monitoring site. Second switchgear housing 6 also includes a busbar section (not separately labeled) that accommodates busbars (not shown) that provide electrical power to circuit breakers (also not shown) mounted in first and second circuit breaker portions 39 and 40 as well as upper and lower cable compartment sections (also not separately labeled).

In the exemplary embodiment shown, an exhaust duct 50 may be arranged between first and second switchgear housings 4 and 6. Exhaust duct 50 is selectively fluidically connected to first circuit breaker portion 29 of first switchgear housing 4 and first circuit breaker portion 39 of second switchgear housing 6 in the event of an arc fault. More specifically, gases that may be generated by an arc fault in one of first circuit breaker portion 29 of first switchgear housing 4 and first circuit breaker portion 39 of second switchgear housing 6 are guided into exhaust duct 50 and guided upwardly from switchgear housing assembly 2.

As shown in FIG. 2, second circuit breaker portion 30 of first switchgear housing 4 includes an interior portion 60 that may house one or more circuit breakers (not shown). Interior portion 60 is fluidically connected to ambient through an exhaust outlet 63. In accordance with an aspect of an exemplary embodiment, a floating flap assembly 68 is arranged in exhaust outlet 63. Floating flap assembly 68 includes a floating flap member 74 slidingly disposed on a first guide rod 80, and a second guide rod 82. Specifically, floating flap member 74 shifts longitudinally upwardly relative to first circuit breaker portion 29 of first switchgear housing 4. Of course, it should be understood that the number of guide rods could vary. Each of first and second guide rods 80 and 82 include a corresponding first and second end stop 84 and 85 that limit outward movement of floating flap member 74. In addition, floating flap member 74 is operatively connected to first and second guide rods 80 and 82 through corresponding first and second bearings 93 and 94. Bearings 93 and 94 reduce sliding friction between floating flap member 74 and guide rods 80 and 82.

At this point, it should also be understood that the term "slidingly disposed" indicates that floating flap member 74 shifts, in its entirety along first and second guide rods 80 and 82. The term "slidingly disposed" should not be understood to describe that floating flap member 74 pivots about an end. The term "longitudinally upwardly" should be understood to describe that floating flap member 74 shifts outwardly of first circuit breaker portion 29 of first switchgear housing 4 along a generally longitudinal axis that extends from bottom wall 11 through top wall 10.

Reference will now follow to FIG. 3 in describing a floating flap assembly 110, in accordance with another aspect of an exemplary embodiment. Floating flap assembly 110 includes a body 114 having a top wall section 116, a bottom wall section 117, a front wall section 118 and a rear wall section 119 that may collectively define exhaust duct 50. Body 114 may also include a generally planar wall 121 extending between top wall section 116, bottom wall section 117, front wall section 118 and rear wall section 119. A divider 125 extends between bottom wall section 117 and top wall section 116. Divider 125 separates exhaust duct 50 into a circuit breaker exhaust portion 127 and a cable compartment exhaust portion 129. It should be understood that floating flap assembly 110 may be formed without a divider. In the exemplary embodiment shown, circuit breaker exhaust portion 127 includes an opening 132 arranged near top wall section 116 and front wall section 118. Opening 132 provides a passage for cables passing to and from monitoring section 32. A busbar frame member 135 is provided on generally planar wall 121 in cable compartment exhaust portion 129. Busbar support member 135 provides electrical insulation for busbars (not shown). In addition, busbar frame member 135 isolates the busbars from hot gases that may flow through floating flap assembly 110.

In further accordance with an exemplary embodiment, floating flap assembly 110 includes a first flap member system 138 and a second, opposing flap member system 139. First and second floating flap member systems 138 and 139 are arranged in circuit breaker exhaust portion 127 and align with a first circuit breaker exhaust opening 141 in first circuit breaker portion 29 of first switchgear housing 4, and a first circuit breaker exhaust opening (not shown) in first circuit breaker portion 39 in second switchgear housing 6. A third floating flap member system 144 and an opposing, fourth floating flap member system 145 are arranged in cable compartment exhaust portion 129. Third and fourth floating flap member systems 144 and 145 generally align with a lower cable compartment exhaust opening 147 of lower cable compartment 37 of first switchgear housing 4 and a second exhaust opening (not shown) of the lower cable compartment (also not shown) formed in second switchgear housing 6. It should be understood that fifth and sixth floating flap member systems 149 and 150 may be provided and associated with second circuit breaker compartment 30 and seventh and eighth floating flap member systems 152 and 153 may be provided and associated with upper cable compartment portion 36.

Figure 4:
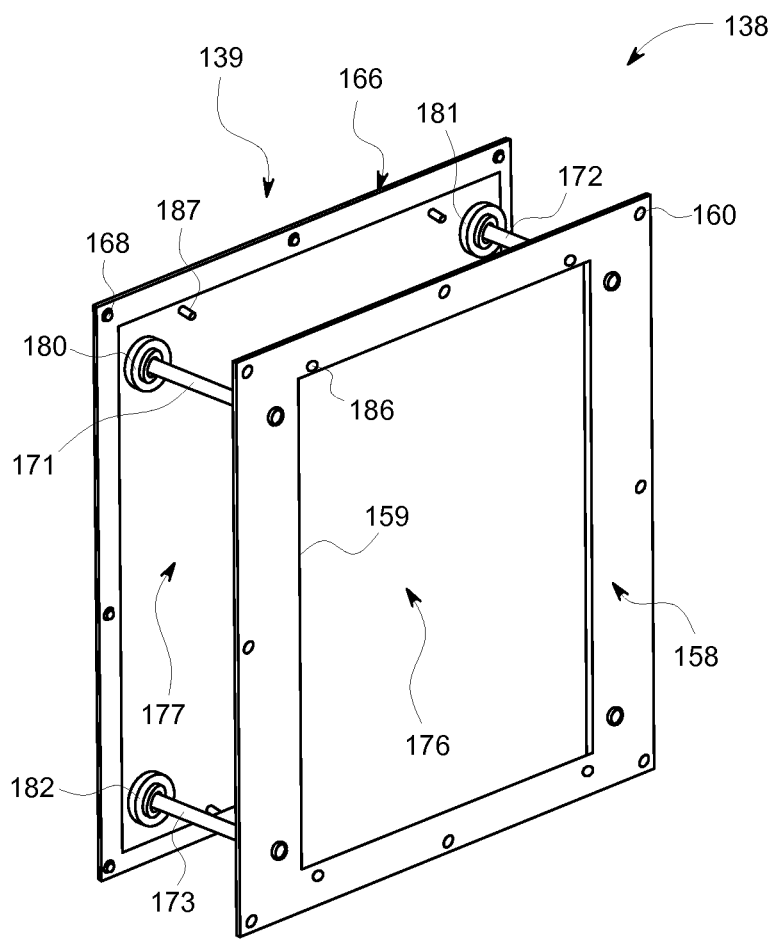
FIG. 4 is a perspective view of a floating flap member of the floating exhaust flap assembly of FIG. 3.

Reference will now follow to FIG. 4 in describing first and second floating flap member systems 138 and 139 with an understanding that the remaining floating flap member systems may be similarly formed. First floating flap member system 138 includes a first frame 158 having a first opening 159 positioned to surround first circuit breaker exhaust opening 141 and a plurality of mounting openings, one of which is shown at 160, that receive a fastener connecting first frame 158 to generally planar wall 121. Second floating flap member system 139 includes a second frame 166 including a second opening 167 that aligns with the second circuit breaker exhaust opening (not shown) and a plurality of mounting openings, one of which is shown at 168, that receive a fastener (not shown) connecting second frame 166 to an opposing wall (also not shown) of floating flap assembly 110.

First frame 158 may be connected to second frame 166 through a first guide rod 171, a second guide rod 172, a third guide rod 173 and a fourth guide rod 174. A first floating flap member 176 is positioned across first opening 159 and supported by first, second, third and fourth guide rods 171-174. A second floating flap member 177 is positioned across second opening 167 and supported by first, second, third and fourth guide rods 171-174. Second floating flap member 177 is supported to first, second, third and fourth guide rods 171-174 through a plurality of bearings, three of which are shown at 180-182. Bearings 180-182 provide a substantially friction free interface between second floating flap member 177 and first, second, third and fourth guide rods 171-174. Similarly, first floating flap member 176 is supported to first, second, third and fourth guide rods 171-174 through a plurality of bearings (not shown).

In further accordance with an exemplary embodiment, first and/or second floating flap members 176 and 177 shift laterally outwardly from corresponding ones of first circuit breaker portion 29 of first switchgear housing 4 and first circuit breaker portion 39 of second switchgear housing 6 in the event of an arcing event. Specifically, an arcing event in, for example, first circuit breaker portion 29 of first switchgear housing 4 will generate high pressure gases that drive first floating flap member 176 laterally outwardly exposing first circuit breaker exhaust opening 141 to exhaust duct 50. The high pressure gases travel upward and outward from top wall section 116 limiting potential damage in first circuit breaker portion 39 of first switchgear housing 4.

In accordance with an aspect of the exemplary embodiment, first floating flap member 176 may be secured to first frame 158 through one or more frangible fasteners, such as shown at 186. Similarly, second floating flap member 177 may be secured to second frame 166 through one or more frangible fasteners 187. Frangible fasteners 186 and 187 maintain first and second floating flap members 176 and 177 against corresponding ones of first and second frames 158 and 166 during shipment and/or installation of switchgear housing assembly 2. Frangible fasteners 186 and 187 are configured to break when exposed to a force generated by the high pressure gases allowing movement of one, or the other of floating flap members 176 and 177.

At this point, it should be understood that the exemplary embodiments describe a switchgear housing assembly that may include a common exhaust duct that guides high pressure gasses from a lower circuit breaker portion of a switchgear housing. The circuit breaker portion may be provided with a conventional valve system that allows the high pressure gases to flow into the exhaust duct, or with the floating flap assembly described above. In addition, a floating flap assembly may be provided on an upper circuit breaker portion to allow high pressure gases to escape in the event of an arc or the like. The floating flap assembly selectively opens to release gases from a portion of switchgear that may form as the result of an arcing event. The term "selectively opens" should be understood to describe that the floating flap may be designed to move in response to a particular pressure that may vary from switchgear to switchgear. The floating flap may be provided with frangible fasteners, as discussed above, designed to fail at a particular pressure threshold, or biasing members, such as springs or the like, may be employed to maintain the flap assembly in a closed position. Further, the flap assembly may be designed with a particular frictional interface that would allow movement at a desired pressure threshold. The biasing members may be designed to give or deflect at a particular pressure allowing the flap assembly to open exposing the gases to an exhaust flow path.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the claims. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A switchgear housing assembly comprising:
   a first switchgear housing including a top wall, a bottom wall, a rear wall and first and second side walls extending between the top wall and bottom wall defining an interior portion including a cable compartment portion, a busbar portion, and at least one circuit breaker portion;
   a second switchgear housing including a top wall, a bottom wall, a rear wall and first and second side walls extending between the top wall and the bottom wall defining an interior portion including a cable compartment section, a busbar section, and at least one circuit breaker section;
   an exhaust duct arranged between the first and second switchgear housings, the exhaust duct being selectively fluidically exposed to at least one of the cable compartment portion, the cable compartment section, the at least one circuit breaker portion, and the at least one circuit breaker section; and
   a floating flap assembly operatively associated with at least one of the first and second switchgear housings, the floating flap assembly including a floating flap member, the floating flap member being selectively slideable between a closed position and an open position without rotating relative to the switchgear housing in response to a pressure rise in one of the cable compartment portion, cable compartment section, at least one circuit breaker portion and at least one circuit breaker section.

2. A switchgear housing assembly comprising:
   a first switchgear housing including a top wall, a bottom wall, a rear wall and first and second side walls extending between the top wall and bottom wall defining an interior portion including a cable compartment portion, a busbar portion, and at least one circuit breaker portion;
   a second switchgear housing including a top wall, a bottom wall, a rear wall and first and second side walls extending between the top wall and the bottom wall defining an interior portion including a cable compartment section, a busbar section, and at least one circuit breaker section; and
   an exhaust duct arranged between the first and second switchgear housings, the exhaust duct comprising a floating flap member arranged to selectively fluidically expose the exhaust duct to at least one of the cable compartment portion, the cable compartment section, the at least one circuit breaker portion, and the at least one circuit breaker section by sliding between a closed position and an open position without rotating relative to the exhaust duct.

3. The switchgear housing assembly according to claim 2, wherein the at least one circuit breaker portion includes a first circuit breaker portion and a second circuit breaker portion, the second circuit breaker portion being arranged between the first circuit breaker portion and the top wall, wherein the first circuit breaker portion is selectively fluidically connected to the exhaust duct.

4. The switchgear housing assembly according to claim 3, wherein the second circuit breaker portion is fluidically isolated from the exhaust duct.

5. A switchgear housing assembly comprising:
   a switchgear housing including a top wall, a bottom wall, a rear wall and first and second side walls extending between the top wall and bottom wall defining an interior portion including a cable compartment portion, a busbar portion, and at least one circuit breaker portion; and a floating flap assembly operatively associated with the switchgear housing, the floating flap assembly including a floating flap member, the floating flap member being selectively slideable between a closed position and an open position without rotating relative to the switchgear housing in response to a pressure rise in one of the cable compartment portion, and at least one circuit breaker portion.

6. The switchgear housing assembly according to claim 5, wherein the floating flap assembly is mounted relative to the top wall, wherein the floating flap member is selectively shiftable longitudinally upwardly in response to the pressure rise in the one of the cable compartment portion, and at least one circuit breaker portion.

7. The switchgear housing assembly according to claim 6, wherein the floating flap assembly includes a first guide rod and a second guide rod, the floating flap member being selectively shiftable across the first and second guide rods in response to the pressure rise in the one of the cable compartment portion, and at least one circuit breaker portion.

8. The switchgear housing assembly according to claim 7, further comprising:
a first bearing associated with the first guide rod and a second bearing associated with the second guide rod, the first and second bearings slidingly supporting the floating flap member relative to the first and second guide rods.

9. The switchgear housing assembly according to claim 5, wherein the floating flap assembly is mounted relative to one of the first and second side walls, wherein the floating flap member is selectively shiftable laterally outwardly in response to the pressure rise in the one of the cable compartment portion, and at least one circuit breaker portion.

10. The switchgear housing assembly according to claim 9, wherein the floating flap assembly includes a first guide rod and a second guide rod, the floating flap member being selectively shiftable across the first and second guide rods in response to the pressure rise in the one of the cable compartment portion, and at least one circuit breaker portion.

11. The switchgear housing assembly according to claim 10, further comprising: a first bearing associated with the first guide rod and a second bearing associated with the second guide rod, the first and second bearings slidingly supporting the floating flap member relative to the first and second guide rods.

12. The switchgear housing assembly according to claim 5, wherein the floating flap assembly includes a body mounted relative to one of the first and second side walls of the switchgear housing, the body including a top wall section, a bottom wall section, a front wall section and a rear wall section and a divider extending between the bottom wall section and the top wall section, the divider establishing a circuit breaker exhaust portion corresponding to the circuit breaker portion and a cable compartment exhaust portion generally corresponding to the busbar portion.

13. The switchgear housing assembly according to claim 12, wherein the floating flap member is arranged in one of the circuit breaker exhaust portion and the cable compartment exhaust portion.

14. The switchgear housing assembly according to claim 13, wherein the floating flap member is arranged in the circuit breaker exhaust portion.

15. The switchgear housing assembly according to claim 14, wherein the floating flap assembly further includes another floating flap member arranged in the cable compartment exhaust portion.

16. The switchgear housing assembly according to claim 13, wherein the floating flap assembly includes a first guide rod and a second guide rod, the floating flap member being configured to selectively shift across the first and second guide rods in response to the pressure rise in the one of the cable compartment portion, and at least one circuit breaker portion.

17. The switchgear housing assembly according to claim 16, further comprising: a first bearing associated with the first guide rod and a second bearing associated with the second guide rod, the first and second bearings slidingly supporting the floating flap member relative to the first and second guide rods.

18. The switchgear housing assembly according to claim 16, wherein the floating flap assembly includes another floating flap member mounted relative to the first guide rod and the second guide rod, the another floating flap member being selectively shiftable across the first and second guide rods toward the floating flap member in response to the pressure rise in the one of the cable compartment portion, and at least one circuit breaker portion.

19. The switchgear housing assembly according to claim 12, further comprising: another switchgear housing mechanically linked to the switchgear housing through the floating flap assembly, the body defining a common exhaust duct arranged between the switchgear housing and the another switchgear housing.

20. The switchgear housing assembly according to claim 12, wherein the top wall section includes an exhaust outlet.

* * * * *